United States Patent Office

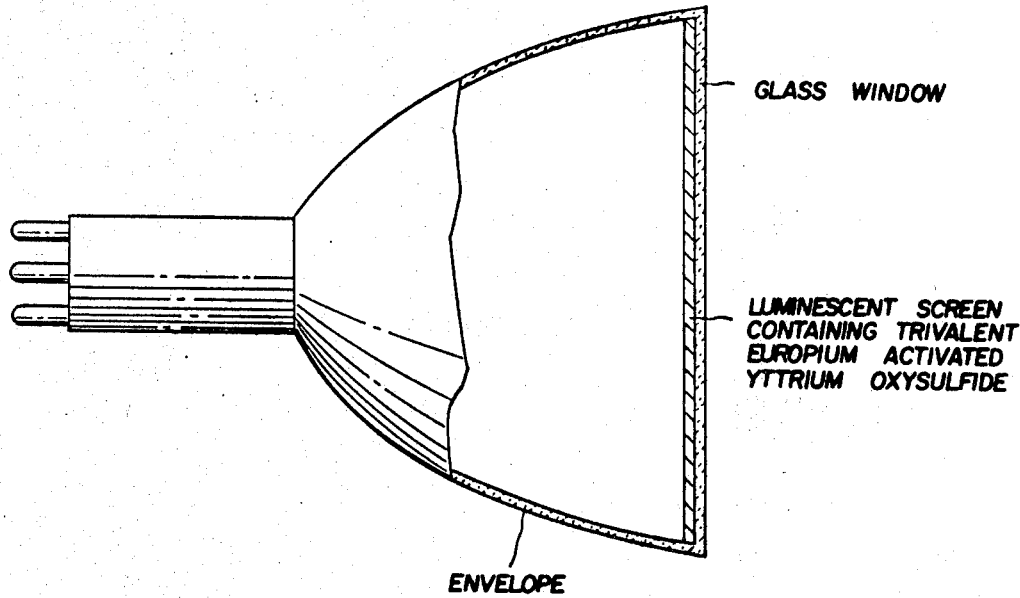

3,563,909
Patented Feb. 16, 1971

3,563,909
METHOD OF PREPARING A LANTHANIDE ACTIVATED YTTRIUM, GADOLINIUM OR LANTHANUM OXYSULFIDE LUMINESCENT MATERIAL
Roelof Egbert Schuil, Johannes Aloysius Maria Dikhoff, and Dirk Barneveld, Emmasingel, Eindhoven, Netherlands, assignors, by mesne assignments, to U.S. Philips Corporation, New York, N.Y., a corporation of Delaware
Filed Mar. 29, 1968, Ser. No. 717,259
Claims priority, application Netherlands, July 1, 1967,
6709191
Int. Cl. C09k 1/14
U.S. Cl. 252—301.4                                                       6 Claims

ABSTRACT OF THE DISCLOSURE

A yttrium, gadolinium or lanthanum oxysulfide phosphor activated with a lanthanide element is produced by the heating of a mixture of the oxides of the metals and sodium or potassium rhodanide.

---

The invention relates to a method of preparing a luminescent material which may be denoted by the general name of oxysulfide, and to a luminescent material prepared by such a method.

The invention further relates to a cathode-ray tube comprising a picture screen containing a material prepared in such manner.

In the Netherlands patent applications 6,603,803 and 6,603,804 laid open to public inspection on Sept. 26, 1966, luminescent substances are described which may be represented by the general formula $M'_{(2-x)}M''_xO_2S$, where M' is inter alia one of the elements yttrium, gadolinium or lanthanum and M'' is at least one member of the group of the lanthanide elements. In this formula $x$ is a number smaller than 0.2 and larger than 0.0002. In the luminescent substances which are represented by the said formula, the element denoted by M'' fulfils the role of activator. The substances may be excited both by ultraviolet radiation and by electrons and then show a different emission according to the activator. For example, with the element terbium as the activator, a blue or green emission is obtained and with the element europium or samarium a red emission is obtained. In particular the compounds with the element europium as the activator are important because substances activated with this element in a trivalent form give a very strong red emission in that part of the spectrum which is particularly desirable in the light to be emitted by the picture screen of a cathode-ray tube which is used for colour television reproduction purposes.

In the above mentioned published Netherlands patent applications a few methods are described of preparing the oxysulfides. All these methods describe the heating of a mixture of two compounds of the elements M' and M'', respectively, at a high temperature at which a reaction occurs between the two solids. If the combined compounds of the elements M' and M'' contain no sulfur, for example, in case oxalates or oxides of M' and M'' are used, the heating for the forming reaction of the ultimate luminescent material must take place in a sulfurating atmosphere. As such may be used a hydrogen sulfide atmosphere or an atmosphere of carbon sulfide. In the detailed description of the examples of the two Netherlands patent applications, heating in a hydrogen sulfide atmosphere is always described.

Although with the known methods according to the Netherlands patent applications good luminescent substances can be obtained, very great drawbacks are involved. One of the most important drawbacks is that a diffusion reaction at high temperature must take place between two substances which are solid at the reaction temperature. As is known such a reaction is very difficult to realize and requires all kinds of precautions. For example, an excellent mixing should be ensured and the heating should usually be continued for a long period of time so as to obtain a proper efficiency of conversion. Another drawback is that the dosing of the correct quantities of substances to be mixed presents difficulties. Actually it is not sure that the ratio which is desired in the final product between the various elements is also obtained if the same ratio is chosen in the starting mixture of substances to be heated.

Heating in an atmosphere of hydrogen sulfide or carbon sulfide is a particularly great drawback. In fact, both these substances are poisonous and in addition foul-smelling. In connection herewith all kinds of measures are necessary for the safety, health and comfort of the workers which are to perform the methods.

In the literature other methods are described for forming oxysulfides of rare earth elements; in these methods always poisonous and/or foul-smelling sulfur compounds are used.

A method according to the invention of preparing a luminescent material which satisfies the formula $$M'_{(2-x)}M''_xO_2S$$

where M' is at least one member of the group consisting of the elements yttrium, gadolinium and lanthanum, M'' is at least one member of the group of the lanthanide elements having an atomic number between 57 and 64 or between 64 and 71, and $x$ is a number smaller than 0.2 and larger than 0.0002, is characterized in that a mixture of an oxide of at least one of the elements M' and of at least one of the elements M'' or of compounds from which said oxides can be formed by heating, and a quantity of rhodanide of at least one of the elements sodium and potassium which is smaller than 3.5 times that quantity with which the oxides of M' and M'' can be fully converted into the luminescent material, is heated at a temperature between 300° and 1500° C.

During heating a reaction occurs in which luminescent oxysulfide is formed. This forming reaction may be represented by the equation:

$$(2-x)M'_2O_3 + xM''_2O_3 + 2(K,Na)CNS \rightarrow 2M'_{(2-x)}M''_xO_2S + 2(K,Na)CNO$$

Since the temperature at which heating takes place is higher than the melting point of potassium rhodanide and sodium rhodanide, the forming reaction is no reaction in which diffusion of two solids in each other must take place as is the case with the above-mentioned known reactions. Actually, the rhodanide melts and the oxides of the elements M' and M'' dissolve in the melted rhodanide. It has been found, however, that if a quantity is present which is less than 3.5 times that quantity of rhodanide with which the quantity of the oxides of M' and M'' present can be fully converted into the luminescent material, no real melt is formed which could be poured, for example, as a liquid, out of the vessel containing the reaction mixture. The reaction according to the invention might be called a quasi-solid-state reaction. As compared with the known real-solid-state reactions the advantage is obtained inter alia that the conversion can take place at a low temperture and is completed rapidly. Furthermore, the efficiency of conversion is very high and may be substantially 100%. The mixing operation also need not be performed so carefully as in a real solid-state reaction, and the correct dosing presents no difficulties.

As stated above, oxides of the elements M' and M'' or compounds from which said oxides can be formed by heating may be used in the reaction mixture. Such compounds are, for example, oxalates or carbonates.

The quantity of rhodanide is chosen to be so large that after cooling the reaction mixture a product is present in the reaction vessel which is not or only slightly baked together and can easily be removed from the reaction vessel. This quantity of rhodanide is slightly dependent upon the starting materials. When oxides of M' and M'' are used, the quantity of rhodanide is preferably chosen to be smaller than when using equivalent quantities of compounds, for example, oxalates or carbonates.

It is often advantageous to previously prepare a compound in which the two elements M' and M'' are already present and to mix said compound with the rhodanide, because in that case usually a more homogeneous reaction product is formed.

If the starting materials are compounds from which the oxides can be formed by heating, the use of oxalates is particularly favourable because these decompose very readily.

The oxysulphides prepared according to a method of the invention luminesce both upon excitation with ultraviolet rays and electrons. They are contained in the reaction mixture obtained after heating. In most of the case it will be necessary to remove the formes oxysulphide from the reaction mixture. This can particularly simply be done by leaching with water in which the oxysulphide is very insoluble and the remaining products of the reaction are very readily soluble.

The luminescence of the oxysulphide prepared and separated in the above described manner can still be improved by heating the oxysulfide at a temperature of 1100° to 1500° C. for 15 minutes to 240 minutes. In this case it should be ensured that no oxidation of the oxysulfide can take place so that the oxides of the elements M' and M'' would be formed again and the sulphur would escape in the form of sulfur dioxide. This can be realized, for example, by performing the heating in nitrogen or in air from which the oxygen has been withdrawn by ar eaction with carbon. For this purpose, in the last-mentioned method a quantity of carbon is placed beside the oxysulfide in the furnace in which heating is carried out.

According to another method, the oxidation of the oxysulphide is counteracted by mixing it with a small quantity of zinc sulfide (1–10% by weight). Actually, upon heating, the zinc sulphide reacts so readily with oxygen that no oxidation of the oxysulfide takes place, the zinc sulfide being converted into zinc oxide which can be easily removed by washing with acetic acid.

According to still another method the oxysulphide is mixed with a cyanate of sodium or potassium (1–10% by weight); the protection against oxidation is obtained in this case in that the cyanate decomposes at the high heating temperature while forming CO which displaces the oxygen and can in addition react with it.

As compared with the above-mentioned known methods of preparing oxysulfides, a method according to the invention has the great advantage that no heating with or in poisonous or foul-smelling substances, for example, hydrogen sulfide, is necessary.

A particularly great advantage is that during the reaction only one luminescent compound is formed, namely the desired oxysulfide. In a reaction in an atmosphere of hydrogen sulfide or with sulfides, always the danger threatens that sulfides are formed in addition to the desired oxysulfide. These sulfides are very disturbing, because usually they do not have the desired luminescence and because they are usually strongly coloured and chemically unstable. The oxysulfides themselves also which are obtained on heating in a hydrogen sulfide atmosphere are often coloured. Afterwards they cannot substantially be made white, not, for example, by washing with acids either. White luminescent substances, however, are highly desirable for most of the applications.

Another great advantage of the method according to the invention is that the starting product rhodanide of potassium or sodium is a cheap substance. Although in itself hydrogen sulfide is not an expensive substance, it has to be transported in cylinders so that high cost of transportation is unavoidable. If hydrogen sulphide is to be prepared on the spot, a bulky and consequently costly apparatus is required for that purpose.

The efficiency of the formation reaction of the oxysulfides according to the invention is substantially 100% which, naturally is a particularly great advantage.

In use the oxysulfides obtained by using a method according to the invention give luminous efficiencies which are at least equally high as the substances obtained according to conventtional methods.

In order that the invention may be readily carried into effect, it will now be described in greater detail with reference to the ensuring specific examples.

EXAMPLE 1

A mixture is prepared from 23.9 gms. $Y_{1.9}Eu_{0.1}O_3$ and 10.0 gms. NaCNS and is transferred to a quartz crucible having a lid. The crucible is placed in a furnace and heated at 1000° C. in air for 2 hours. After cooling the crucible with contents, the contents are leached with water and filtered. The solid remaining on the filter is dried. This solid is a luminescent oxysulphide having a composition which satisfies the formula $Y_{1.9}Eu_{0.1}O_2S$. Upon excitation with electrons, it luminesces with a brightness which is 130% of the brightness of red luminescing yttrium vanadate activated with trivalent europium. (This latter substance is a known red luminescing component in picture screens of cathode-ray tubes for reproducing colour television pictures.) After the measurement the same substance was heated at a temperature of 1250° C. in a nitrogen atmosphere for 2 hours. The brightness of the luminesce of the substance after heating was 140% with respect to the brightness of yttrium vanadate.

EXAMPLE 2

A mixture is prepared from 48 gms. $Y_{1.9}Tb_{0.1}O_3$ and 20.0 gms. NaCNS and is transferred to a quartz crucible having a lid. The crucible is placed in a furnace and heated at 700° C. in air for 2 hours. After cooling the crucible with contents, the contents are leached with water and filtered. The luminescing oxysulfide remaining on the filter and having a composition which satisfies the formula $Y_{1.9}Tb_{0.1}O_2S$ is then dried and mixed with 5% by weight of zinc sulfide. The mixture is heated in air at a temperature of 1250° C. for 2 hours. After cooling the mixture is washed with dilute acetic acid to remove the ZnO formed from the ZnS during the last heating. Upon excitation with electrons, the resulting product shows a green luminescence having an energy efficiency of 8.5%.

EXAMPLE 3

A mixture is prepared from 77 gms. $Y_{1.9}Eu_{0.1}(C_2O_4)_3$ and 40 gms. NaCNS. This mixture is heated in a quartz crucible having a lid for 2 hours in air at a temperature of 600° C. After cooling, the contents of the crucible are poured in water and the part of the reaction mixture not dissolved in water is filtered off, washed with water and dried. The dry substance is then mixed with 5% by weight of zinc sulfide. The mixture is heated in air for 2 hours at a temperature of 1250° C. in a quartz crucible having a lid. The product obtained after said heating is washed with acetic acid, rinsed with water and dried. The resulting white final product has a strong red luminescence upon excitation with electrons and has an energy efficiency of 9%.

The luminescing product has a composition which satisfies the formula: $Y_{1.9}Eu_{0.1}O_2S$.

EXAMPLE 4

A mixture is prepared from 40 gms. $Y_{1.9}Eu_{0.1}O_3$ and 21 gms. KCNS. The mixture is heated in a quartz crucible having a lid for 30 minutes in air at a temperature of 650° C. The temperature is then rapidly raised to 1250° C. and the crucible with contents is kept at this temperature for 1 hour. After cooling the contents of the crucible are poured in water and the oxysulfide not dissolved in the water is filtered off, washed with water and dried. The resulting white product shows a strong red luminescence with an energy efficiency of 9% upon excitation with electrons.

The luminescing product has a composition which is equal to that of the Examples 1 and 3.

During the second heating at a temperature of 1250° C. a part of the KCNO formed during the first heating and which, in fact, was not removed, decomposes. The CO formed during this reaction protects the oxysulfide from oxidation.

The luminescent substances prepared by means of a method according to the invention can be provided in known manner on the substrate of the picture screens in cathode-ray tubes or on the wall of the electric gas discharge lamps. In this connection they present no particular difficulties with respect to corresponding compounds prepared in a different manner. A cathode ray tube employing the phosphor prepared according to the method of the invention is shown in the drawing the sole figure of which is a sectional view of a cathode ray tube having an envelope with a glass window and a luminescent screen located on the inside of the window and containing a trivalent europium activated yttrium oxysulfide phosphor of the invention.

What is claimed is:

1. A method of producing a luminescent material of the formula $M'_{(2-x)}M''_xO_2S$ wherein M' is at least one element selected from the group consisting of yttrium, gadolinium and lanthanum, M'' is at least one lanthanide element having an atomic number either between 57 and 64 or between 64 and 71 and $x$ is a number smaller than 0.2 and larger than 0.0002, said method comprising heating, at a temperature between 300° C. and 1500° C., a mixture of at least one compound capable of yielding an oxide of the element M', at least one compound capable of yielding an oxide of the element M'' and at least one alkali metal rhodanide selected from the group consisting of sodium and potassium, the amount of the rhodanide being less than 3.5 times that required to form the luminescent material with the oxides of M' and M'' and separating out the resultant oxysulfide luminescent material from the reaction mixture.

2. The method of claim 1 wherein a mixed oxide of the elements M' and M'' is employed.

3. The method of claim 2 wherein a mixed oxalate of M' and M'' is employed.

4. The method of claim 1 wherein the insoluble oxysulfide luminescent material is removed from the reaction mixture by leaching the reaction mixture with water to remove all water soluble compounds.

5. The method of claim 4 wherein the oxysulfide, after being separated from the reaction mixture, is heated at a temperature of between 1100° C. to 1500° C. for 15 to 240 minutes under non-oxidizing conditions.

6. The method of claim 5 wherein the separated oxysulfide is mixed, prior to heating, with 1 to 10% by weight of a compound selected from the group consisting of zinc sulfide, potassium cyanate and sodium cyanate.

References Cited

UNITED STATES PATENTS

| | | | |
|---|---|---|---|
| 3,418,247 | 12/1968 | Yocom | 252—301.4S |
| 3,418,246 | 12/1968 | Royce | 252—301.4S |
| 3,423,621 | 1/1969 | Royce | 252—301.4S |

JOBIAS E. LEVOW, Primary Examiner

R. D. EDMONDS, Assistant Examiner

PO-1050
(5/69)

UNITED STATES PATENT OFFICE
CERTIFICATE OF CORRECTION

Patent No. 3,563,909 (PHN 2576) Dated February 16, 1971

Inventor(s) ROELOF EGBERT SCHUIL ET AL

It is certified that error appears in the above-identified patent and that said Letters Patent are hereby corrected as shown below:

Column 1, line 11, after "priority" insert

-- application Netherlands March 31, 1967, 6,704,591,-

Signed and sealed this 29th day of May 1973.

(SEAL)
Attest:

EDWARD M. FLETCHER, JR.
Attesting Officer

ROBERT GOTTSCHALK
Commissioner of Pat